United States Patent
Bellis

(10) Patent No.: US 11,352,905 B2
(45) Date of Patent: Jun. 7, 2022

(54) LUBRICATION SYSTEM

(71) Applicant: ROLLS-ROYCE plc, London (GB)

(72) Inventor: Mark Je Bellis, Derby (GB)

(73) Assignee: Rolls-Royce plc, London (GB)

( * ) Notice: Subject to any disclaimer, the term of this patent is extended or adjusted under 35 U.S.C. 154(b) by 481 days.

(21) Appl. No.: 16/582,083

(22) Filed: Sep. 25, 2019

(65) Prior Publication Data
US 2020/0116048 A1 Apr. 16, 2020

(30) Foreign Application Priority Data
Oct. 10, 2018 (GB) .................................. 1816504.3

(51) Int. Cl.
*F01D 25/18* (2006.01)
*F16H 57/04* (2010.01)

(52) U.S. Cl.
CPC ......... *F01D 25/18* (2013.01); *F16H 57/0443* (2013.01); *F16H 57/0445* (2013.01); *F16H 57/0452* (2013.01); *F05B 2220/30* (2013.01); *F05D 2260/602* (2013.01)

(58) Field of Classification Search
CPC .... F01D 25/18; F16H 57/0443; F16H 57/045; F16H 57/0452; F05D 2260/602; F01M 9/106; F01M 2011/0083; F01M 2011/0087
See application file for complete search history.

(56) References Cited

U.S. PATENT DOCUMENTS

| | | | |
|---|---|---|---|
| 5,121,815 A * | 6/1992 | Francois | ................. B64C 27/12 184/6.12 |
| 8,020,665 B2 | 9/2011 | Sheridan et al. | |
| 8,511,435 B2 | 8/2013 | Sheridan et al. | |
| 8,601,785 B2 | 12/2013 | Legare | |
| 8,651,240 B1 | 2/2014 | Motto | |
| 8,814,505 B2 | 8/2014 | Bellis | |
| 9,765,875 B2 * | 9/2017 | Sheridan | ............... F16H 57/045 |
| 2009/0183950 A1 | 7/2009 | Brouillet et al. | |

(Continued)

OTHER PUBLICATIONS

European search report dated Oct. 16, 2019, issued in EP Patent Application No. 19196340.

(Continued)

*Primary Examiner* — Minh Truong
(74) *Attorney, Agent, or Firm* — Crowell & Moring LLP

(57) ABSTRACT

A Lubrication system for an engine component of a gas turbine engine, such as a planetary gearbox. The system comprises a main lubrication system comprising a main tank configured to supply lubricant to the engine component, and a main reservoir configured to collect lubricant scavenged from the engine component after lubrication; and an auxiliary lubrication system comprising an auxiliary reservoir configured to collect lubricant scavenged from the engine component after lubrication and to supply scavenged lubricant to the engine component. Main reservoir comprises an interior and the auxiliary reservoir is located within the interior of the main reservoir. The auxiliary reservoir comprises an upper portion, a lower portion and a lubricant pickup region, the upper portion comprising an opening arranged to permit lubricant to overflow into the main reservoir, and the lower portion of the auxiliary reservoir being shaped to cause lubricant to drain towards the lubricant pickup region.

7 Claims, 3 Drawing Sheets

(56) References Cited

U.S. PATENT DOCUMENTS

| | | | |
|---|---|---|---|
| 2010/0294597 A1* | 11/2010 | Parnin | F01D 25/18 |
| | | | 184/26 |
| 2010/0317477 A1 | 12/2010 | Sheridan et al. | |
| 2012/0103728 A1 | 5/2012 | Portlock et al. | |
| 2012/0192974 A1 | 8/2012 | Szolomayer et al. | |
| 2013/0048091 A1* | 2/2013 | DiBenedetto | F02C 7/06 |
| | | | 137/2 |
| 2013/0283756 A1 | 10/2013 | Baker et al. | |
| 2013/0319006 A1 | 12/2013 | Parnin et al. | |
| 2014/0076661 A1 | 3/2014 | Xu | |
| 2016/0245117 A1 | 8/2016 | Parnin et al. | |
| 2018/0073395 A1* | 3/2018 | Parnin | F16H 57/0442 |
| 2020/0124162 A1* | 4/2020 | Fujii | F16H 57/0441 |

OTHER PUBLICATIONS

Great Britian search report dated Mar. 21, 2019, issued in GB Patent Application No. 1816504.3.

* cited by examiner

LUBRICATION SYSTEM

CROSS-REFERENCE TO RELATED APPLICATIONS

This specification is based upon and claims the benefit of priority from United Kingdom patent application number GB 1816504.3 filed on Oct. 10, 2018, the entire contents of which are incorporated herein by reference.

BACKGROUND

Technical Field

The present disclosure relates to a lubrication system, and more particularly to a lubrication system for a gas turbine engine, such as a geared gas turbine engine.

Description of the Prior Art

In a gas turbine engine, a turbine that is downstream of a combustor extracts mechanical work from fluid downstream of the combustor. The turbine is mechanically coupled to a compressor that is upstream of the combustor by a core shaft, so that the turbine drives the compressor. The compressor and the turbine are provided in a region of the engine that is termed the engine core.

In a geared turbofan engine, a gearbox is provided. The gearbox typically couples the core shaft to a fan that is upstream of the engine core. It is known to use a reduction gearbox to reduce the angular speed of rotation of the fan, relative to the core shaft. This can result in improved efficiency. It may also be possible for a gearbox to couple a core shaft to a turbine that is downstream of the core shaft, thereby allowing a different rotational speed for the turbine, relative to the core shaft.

The gearbox is a safety critical part of the engine, since failure of the gearbox will result in a loss of drive to the fan, which is responsible for the majority of thrust from the engine. Furthermore, a loss of lubricant to the gearbox might result in seizing of the gearbox and hence seizing of the fan, introducing significant drag on the aircraft. Maintaining a supply of lubricant to the gearbox is particularly important for extended operations (ETOPs) flights, where a locked fan rotor of a very large fan would have high-severity at engine and airframe level. It is thus important that the supply of lubricant (e.g. oil) to the gearbox is reliable, both for safety and to avoid wear and damage to bearings of the gearbox in the event of a failure of some kind.

Furthermore, during windmill operation, when the engine is shut down in flight, the wind continues to rotate the fan and hence the gearbox. The gearbox thus needs to maintain lubrication even when the engine is shut down, for instance in a failure condition. For an ETOPs flight this means that lubrication may need to be maintained for an extended time, possibly up to 10 hours, if the aircraft is to reach its destination without being diverted. Even if the aircraft is diverted, the nearest diversion airport could be as far as 390 minutes from the flight path of an ETOPs flight, especially over oceans. It is thus desirable to provide a lubrication system that is reliable in the event of an engine failure in an ETOPs flight.

United States patent application US 2013/319006 A1 describes a lubrication system for a fan drive gear system that includes a main lubrication system and an auxiliary lubrication system having a reservoir arranged to supply oil to bearings of a gearbox for a short time in the event of a failure in the main lubrication supply.

United States patent application US 2012/192974 A1 describes an assembly for holding a fluid includes an auxiliary reservoir inside a main reservoir. The auxiliary reservoir includes an auxiliary reservoir shell with a fill passage at or near its bottom. The auxiliary reservoir shell also has a vent passage at or near its top. The fill passage and the vent passage fluidically connect the auxiliary reservoir to the main reservoir. A fluid inlet is located inside the main reservoir and outside of the auxiliary reservoir. A fluid outlet located inside the auxiliary reservoir between the fill passage and the vent passage.

SUMMARY

The present disclosure provides a lubrication system, a gas turbine engine for an aircraft, and a method of filling a lubrication system for a gearbox of a gas turbine engine, as set out in the appended claims.

According to a first aspect there is provided a lubrication system for an engine component of a gas turbine engine, the system comprising:
  a main lubrication system comprising a main tank configured to supply lubricant to the engine component, and a main reservoir configured to collect lubricant scavenged from the engine component after lubrication; and
  an auxiliary lubrication system comprising an auxiliary reservoir configured to collect lubricant scavenged from the engine component after lubrication and to supply scavenged lubricant to the engine component;
  the main reservoir comprising an interior and the auxiliary reservoir is located within the interior of the main reservoir.
  wherein the auxiliary reservoir comprising an upper portion, a lower portion and a lubricant pickup region, the upper portion comprising an opening arranged to permit lubricant to overflow into the main reservoir, and the lower portion of the auxiliary reservoir being substantially hemispherical to cause lubricant to drain towards the lubricant pickup region.

The lubrication system may be configured such that the auxiliary reservoir overflows into the main reservoir, for example when the auxiliary reservoir is full or has reached a predetermined capacity. The auxiliary reservoir comprises an upper portion and a lower portion, wherein the upper portion comprises an opening arranged to permit lubricant to overflow into the main reservoir.

References to "upper" and "lower" refer to the normal usage orientation of the lubrication system. Similarly, references to the "capacity" of the auxiliary reservoir refer to the capacity when in a normal usage orientation.

The auxiliary reservoir has a lubricant pickup region, and the lower portion of the auxiliary reservoir is shaped, for example curved, to cause lubricant to drain towards the lubricant pickup region, more particularly the lower portion of the auxiliary reservoir is substantially hemispherical.

The opening in the upper portion of the auxiliary reservoir may comprise an inlet region that is operable to receive scavenged lubricant from the engine component.

The upper portion may further comprise a lip circumscribing the opening. The lip may be shaped so as to inhibit lubricant from flowing out of the reservoir through the opening when the reservoir is not in a normal usage orientation. The lip may comprise a curved region circumscribing the opening. The curved region may have a tighter cross-sectional curve than a curve of an adjacent section of the upper portion.

The auxiliary reservoir may comprise a capacity selected such that the auxiliary reservoir is operable to supply lubricant to the engine component for a preselected time period.

The main reservoir may comprise a second lubricant pickup region in a lower portion of the main reservoir, wherein the lower portion of the main reservoir is shaped to cause lubricant to drain towards the second lubricant pickup region.

The lubrication system may further comprise a first lubricant scavenge path via which lubricant scavenged from the engine component is channelled to the auxiliary reservoir and a second lubricant scavenge path via which lubricant scavenged from the engine component is channelled to the auxiliary reservoir. An isolation valve may be provided on each of the first and second lubricant scavenge paths. The first and second scavenge paths may thus be isolated individually in the event of a leak in one of the paths.

The engine component may be a gearbox comprising one or more journal bearings, and the main and auxiliary lubrication systems may be configured to supply lubricant to the journal bearings.

According to a second aspect there is provided a gas turbine engine for an aircraft comprising:
  an engine core comprising a turbine, a compressor, and a core shaft connecting the turbine to the compressor;
  a fan located upstream of the engine core, the fan comprising a plurality of fan blades;
  a gearbox that receives an input from the core shaft and outputs drive to the fan so as to drive the fan at a lower rotational speed than the core shaft; and
  a lubrication system according to the first aspect.

The turbine may be a first turbine, the compressor may be a first compressor, and the core shaft may be a first core shaft. The engine core may further comprise a second turbine, a second compressor, and a second core shaft connecting the second turbine to the second compressor; and the second turbine, second compressor, and second core shaft may be arranged to rotate at a higher rotational speed than the first core shaft.

The gearbox may output drive to the fan via a fan shaft, wherein the fan shaft does not comprise a mechanical fuse.

According to a third aspect there is provided a method of filling a lubrication system of the first aspect, the method comprising the steps of
  filling the auxiliary reservoir of the lubrication system of the first aspect with a lubricant; and
  overflowing lubricant from the auxiliary reservoir into the main reservoir to at least partially fill the main reservoir.

The method may further comprise supplying lubricant from the auxiliary reservoir to the gearbox.

The lubrication system may further comprise a first lubricant scavenge path via which lubricant scavenged from the gearbox is channelled to the auxiliary reservoir and a second lubricant scavenge path via which lubricant scavenged from the gearbox is channelled to the auxiliary reservoir, and wherein an isolation valve is provided on each of the first and second lubricant scavenge paths. The method may further comprise closing an isolation valve on the first lubricant scavenge path and channelling lubricant to the auxiliary reservoir via the second lubricant scavenge path.

The lubrication system may be in accordance with the first aspect.

According to a further aspect there is provided a lubrication system for a mechanical component, the system comprising:
  a main lubrication system comprising a main tank configured to supply lubricant to the mechanical component, and a main reservoir configured to collect lubricant scavenged from the mechanical component after lubrication; and
  an auxiliary lubrication system comprising an auxiliary reservoir configured to collect lubricant scavenged from the mechanical component after lubrication and to supply scavenged lubricant to the mechanical component;
  wherein the main reservoir comprises an interior and the auxiliary reservoir is located within the interior of the main reservoir.

The features of each aspect above may be combined with those of any other aspect, including any of the optional features thereof. The features of each aspect may be combined with any of the features mentioned below with reference to a gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit to) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc).

Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

In use, a gas turbine engine described and/or claimed herein may operate in ETOPS conditions.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Embodiments will now be described by way of example only, with reference to the Figures.

Figure 1:
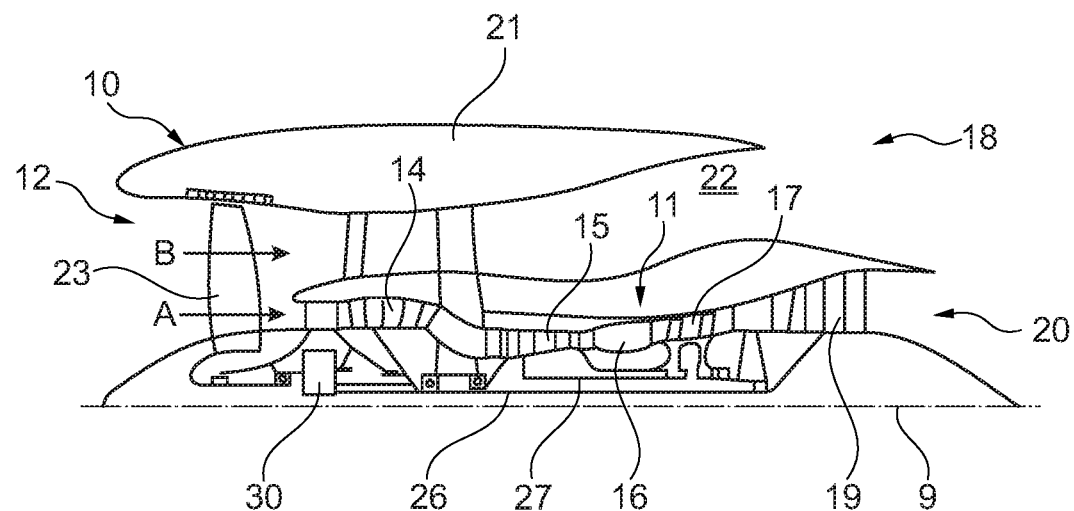
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
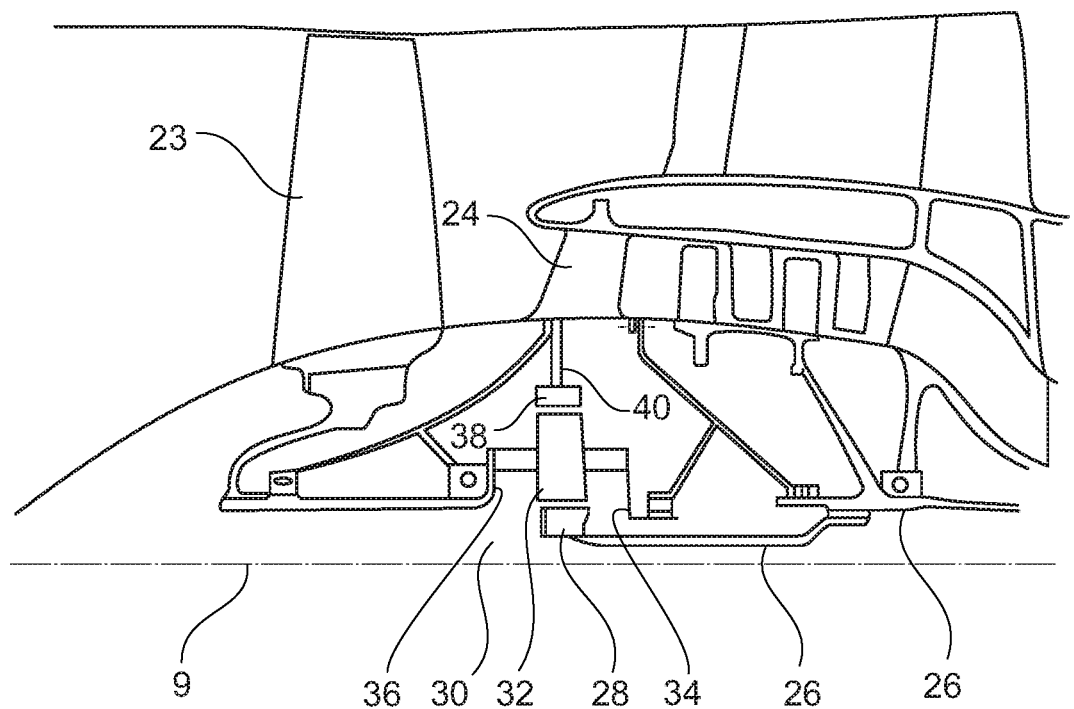
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

The term "PGB" as used herein is a reference to a planetary gearbox. It will be understood that other types of gearbox may also be used.

Figure 3:
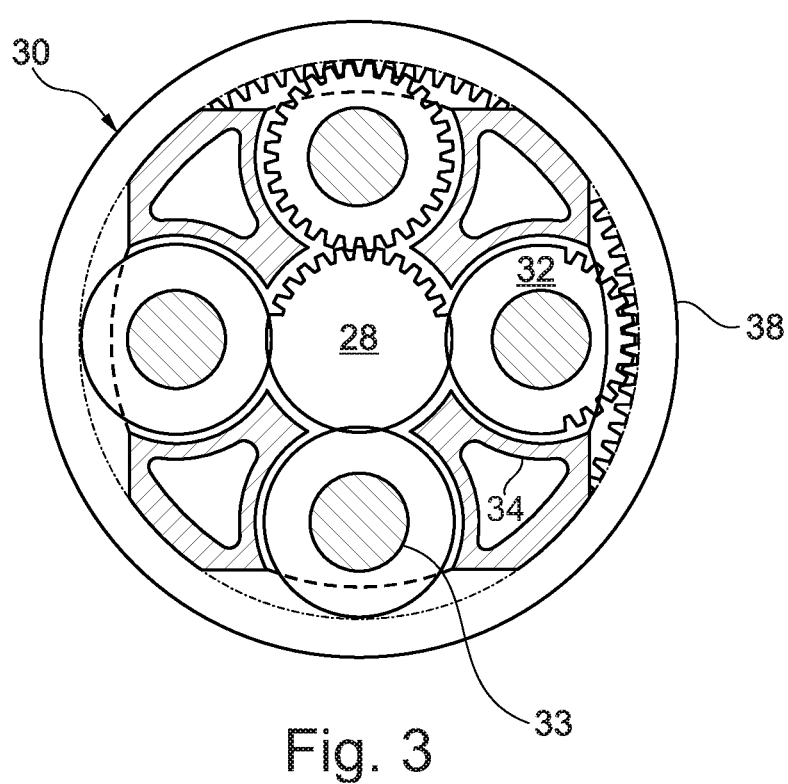
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed disclosure. Practical applications of a planetary epicyclic gearbox 30 generally comprise at least three planet gears 32. The planet gears 32 are supported for rotation on bearings. The bearings may be of any suitable kind, such as journal bearings 33 or rolling element bearings.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30, and the lubrication system may supply lubricant to one of more other engine components requiring lubrication.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
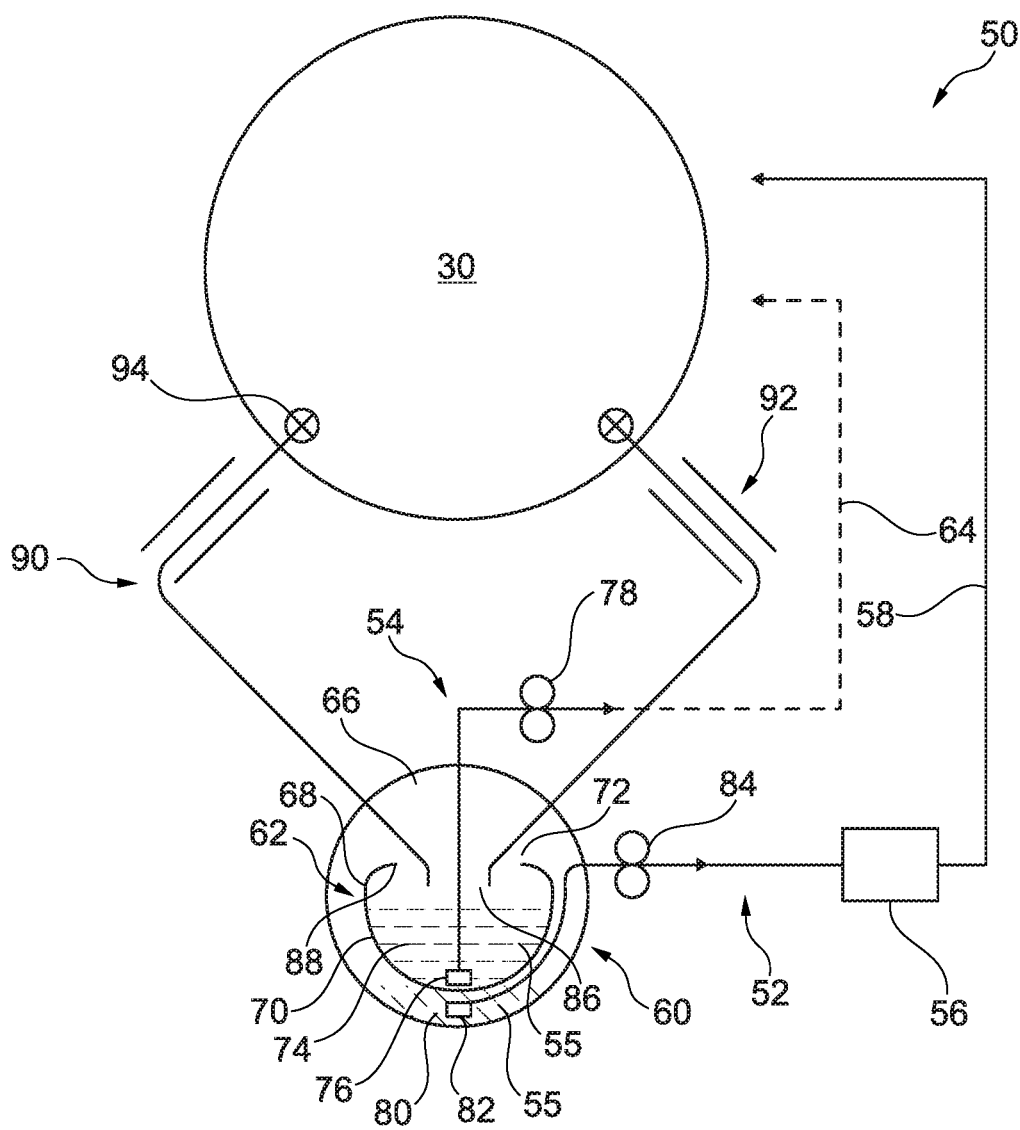
FIG. 4 is a schematic view of a lubrication system for an engine component of a gas turbine engine.

FIG. 4 shows an exemplary lubrication system 50 for an engine component of a gas turbine engine. In the example shown the engine component is a gearbox, for example a PGB 30 of the type described above. The lubrication system may supply lubricant, for example oil, to the journal bearings of the gearbox.

The intent of the lubrication system described herein is to provide a single-failure-robust system, whereby any single failure would not deprive a component lubricated by the system of its oil supply. In the example shown, where lubricant is supplied to the journal bearings 33 of a gearbox 30, maintaining a supply of lubricant to the journal bearings in the event of an engine failure would mean that the gearbox would not seize and there would be no drag beyond the expected windmill drag level. The aircraft could thus reach its intended destination, so avoiding the costs of diversion and of any further damage to the engine. The safety risks of excessive drag and emergency landing or non-completion of the flight could also be avoided.

The system shown in FIG. 4 embodies the principle that "no single failure shall lose both the main and auxiliary oil supplies to the journal bearings of the power gearbox". The context of the disclosure is an aircraft without significant negative-gravity events, e.g. an aircraft having a regular aircraft attitude of +/−45 degrees.

The exemplary lubrication system 50 shown in FIG. 4 comprises a main lubrication system 52 and an auxiliary lubrication system 54. The main lubrication system 52 includes a main tank 56 configured to supply lubricant 55 to the gearbox 30 via a main lubricant path 58, and a main reservoir 60 configured to collect lubricant scavenged from the gearbox after lubrication. The auxiliary lubricant system 54 includes an auxiliary reservoir 62 configured to collect lubricant scavenged from the gearbox after lubrication and to supply scavenged lubricant to the gearbox via an auxiliary lubricant path 64. The main reservoir 60 comprises an interior 66. The auxiliary reservoir 62 is located within the interior 66 of the main reservoir.

This arrangement whereby the auxiliary oil supply reservoir is located within the main reservoir has the result that all auxiliary reservoir leak failures would leak into the main reservoir below it. Thus in the event of a failure in the auxiliary lubrication reservoir, any leaking lubricant will not escape the lubrication system as a whole and the gearbox will continue to be supplied with lubricant by the main lubrication system.

In the example shown in FIG. 4 the lubrication system is arranged so that the auxiliary reservoir overflows into the main reservoir. In particular, the auxiliary reservoir 62 comprises an upper portion 68 and a lower portion 70. The upper portion comprises an opening 72 that is arranged to permit lubricant to overflow into the main reservoir. The auxiliary reservoir may thus be filled first, and the main reservoir may be filled by overflow from the auxiliary reservoir.

It will be appreciated that the terms "upper" and "lower" as used herein refer to the typical orientation of the lubrication system when installed in a gas turbine engine (this may be, for example, but not limited to, a wings level flight orientation or wheels level parked position).

The auxiliary reservoir comprises a capacity selected such that the auxiliary reservoir is operable to supply lubricant to the engine component for a preselected time period. This time period may be an expected maximum flight duration (e.g. 6 hours, 7 hours, 8 hours, 9 hours, 10 hours or more), or may be a shorter period, such as an expected maximum diversion duration (e.g. 3 hours, 4 hours, 5 hours, 6 hours or more).

The capacity of the auxiliary reservoir is selected such that if there is a leak in the main lubricant system then the auxiliary reservoir holds enough oil to recirculate to the engine component (e.g. gearbox, or gearbox journal bearings), given expected losses over the relevant time period. The capacity of the auxiliary reservoir may be in the range 4-30 litres, for instance 4 litres, 5 litres, 10 litres, 20 litres or 30 litres. The loss of one litre of oil per flight might be a typical expected fault-free usage level. With a main system leak and no leakage from the auxiliary system, an auxiliary reservoir capacity of 4 to 5 litres would be enough to supply the journal bearings of a large engine gearbox in windmill mode, given that oil already in the system would flow back to the auxiliary reservoir rather than the main reservoir. A greater capacity of up to 30 litres for the auxiliary reservoir would be enough to run the journal bearings continuously at idle or a greater power level, depending on other factors. The selection of a larger capacity depends on the intended level of engine thrust and ETOPs rating following main oil system failure, and the potential to supply other oil sub-systems from either reservoir.

The auxiliary reservoir 62 comprises a lubricant pickup region 74. A strainer 76 is located in the lubricant pickup region. An auxiliary lubricant system pump 78 is operable to draw scavenged lubricant from the auxiliary reservoir 62 using the strainer.

The lower portion of the auxiliary reservoir is shaped, for instance curved, to cause scavenged lubricant to drain towards the lubricant pickup region. For a civil aircraft without significant negative-gravity events, the shape of each reservoir is set to manage a regular aircraft attitude of +/−45 degrees.

In order to manage the overflow at all attitudes of pitch and roll, the inner, auxiliary reservoir is substantially hemispherical in its lower half.

The upper portion 68 of the auxiliary reservoir may further comprise a lip 88 circumscribing the opening 72. The lip is shaped so as to inhibit lubricant from flowing out of the reservoir through the opening when the reservoir is not in a normal usage orientation. For instance, the lubrication system may be intended for usage in an aircraft without significant negative-gravity events and having a normal aircraft attitude of +/−45 degrees. In such a scenario the lip may be shaped so as to inhibit lubricant escaping through the opening at aircraft attitudes of, for example, +/−45 degrees (unless the auxiliary reservoir is full to capacity, in which case lubricant may overflow). When the auxiliary reservoir is inclined more than +/−45 lubricant may overflow from the reservoir. In that case, overflowing lubricant would be caught by the main reservoir beneath, and would not escape the lubricant system as a whole.

Figure 5:
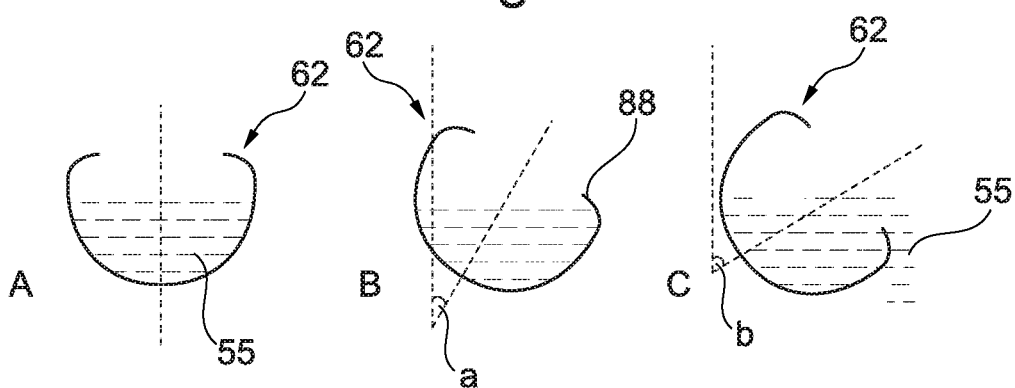
FIG. 5 is a schematic illustration of an auxiliary oil supply reservoir in A an intended normal (e.g. level) condition, B an inclined condition and C an inclined overflowing condition.

FIG. 5 schematically illustrates an auxiliary reservoir at a plurality of possible in-flight inclinations. In picture A of FIG. 5 the auxiliary reservoir 62 is shown in an intended normal (e.g. 0 degrees/level) condition. The reservoir has a capacity that is filled with a pre-defined volume of lubricant 55. Picture B shows the same auxiliary reservoir in an inclined condition, wherein the incline a is less than an expected operating incline (e.g. less than +/−45). Lubricant 55 remains held within the reservoir. In the example shown, the lip 88 has a tighter cross-sectional curve than a curve of an adjacent section of the upper portion and inhibits the lubricant from overflowing. Picture C shows the auxiliary reservoir 62 in an inclined overflowing condition, wherein the incline b is greater than an expected operating incline (e.g. greater than +/−45). A large volume of lubricant remains held within the reservoir, however some lubricant 55 overflows from the auxiliary reservoir into the main reservoir (not shown).

Referring again to FIG. 4, the main reservoir 60 comprises a second lubricant pickup region 80, and the lower portion of the main reservoir is shaped, for instance curved, to cause lubricant to drain towards the second lubricant pickup region. For example, the outer, main reservoir may be spherical or a large tube with rounded ends. A second strainer 82 is located in the second lubricant pickup region 80. A main lubricant system pump 84 is operable to draw scavenged lubricant from the main reservoir 60 using the strainer and return it to the main lubricant tank 56.

When the lubrication system is in use, lubricant is scavenged from the PGB and returned to the lubrication system. The system may include a first lubricant scavenge path 90 and a second lubricant scavenge path 92. In the example shown both lubricant scavenge paths 90, 92 channel lubricant scavenged from the PGB to the auxiliary reservoir. If the auxiliary reservoir is overfilled (e.g. filled to include a greater volume of lubricant than the predefined capacity) then excess lubricant overflows into the main reservoir beneath.

The entry points to the oil collector may use air separating devices to optimise the composition of the fluid for the collection function.

If the oil collector is located low down in the core equipment zone or fan case zone then the flow of oil would cross the gas path via at least one static vane. Isolation valves 94 may be provided on each of the first and second lubricant scavenge paths to protect each oil scavenge path prior to it crossing the gas path, so that a leak could be isolated, allowing the remainder of a plurality of redundant pipes to continue to flow. This minimises risk of oil leak into the gas path, which may have risks of oil finding its way into an aircraft cabin bleed and/or turbine cooling air ducts.

In the example shown the opening 72 in the upper portion of the auxiliary reservoir 62 comprises an inlet region 86 that is operable to receive scavenged lubricant from the PGB. However, lubricant could be returned to the auxiliary reservoir (and, if required, main reservoir) at any suitable location.

The systems described above have the advantage that no single failure shall cause loss of oil flow to the journal bearings of the power gearbox. This would enable the engine to be certified for ETOPs at the longest distance (e.g. 390 minutes), for use on the longest routes (e.g. Los Angeles to Sydney). It would enable sustained windmilling of the engine fan and power gearbox after shutdown, without excessive drag. This would allow the aircraft to reach its intended destination, avoiding the costs of diversion and any additional engine repairs.

A further benefit afforded by the systems described herein when integrated into the engine design is that such a failure-redundant oil system would obviate the need for a mechanical fuse in the fan shaft, which would have detached the fan from the gearbox in the event of over-torque. If the gearbox did not seize then this would reduce the threat to the fan shaft. A fuse might otherwise be problematic as a source of inadvertent fan shaft failure.

If required, the entire preferentially-filled auxiliary system might be encased within the main system. The system architecture should be consistent in order to achieve the full benefit for ETOPs compliance of each product. Sufficient sensors would be included to provide detection of the first failure of each type, to enable the redundancy to be realised. These may be configured for minimal weight (smaller product) or maximum convenience (larger product).

While the lubricant systems above have been described primarily with reference to a gas turbine engine it will be appreciated that the systems are also applicable to a power gearbox oil supply in an open rotor engine. This would be similar in a "puller" configuration at the front of the engine. In a "pusher" configuration the oil flow may pass through turbine exit vanes and/or guide vanes part-way through the set of turbines. Heat management methods would need to be employed. The use in an open rotor engine may be mitigated if the prop-fan blades were able to change in pitch to a fully-feathered position, with each blade chord substantially parallel to the mean airflow across it, resulting in minimal rotation with minimal drag rather than a mandatory minimum windmill rotation speed.

The device is applicable to any system requiring an auxiliary oil supply where there is a need for no single failure disabling all oil supplies. It can be applied to any chemical, cooling or water plant where there is a need for no single failure resulting in leakage of all of the fluid, which would disable the plant. It also could be applied to fluid systems of any vehicle that experiences significant attitude changes in pitch or roll.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A lubrication system for an engine component of a gas turbine engine, the lubrication system comprising:
   a main lubrication system comprising a main tank configured to supply lubricant to the engine component, and a main reservoir configured to collect lubricant scavenged from the engine component after lubrication;
   an auxiliary lubrication system comprising an auxiliary reservoir configured to collect lubricant scavenged from the engine component after lubrication and to supply scavenged lubricant to the engine component;
a first lubricant scavenge path via which lubricant scavenged from the engine component is channelled to the auxiliary reservoir; and
a second lubricant scavenge path via which lubricant scavenged from the engine component is channelled to the auxiliary reservoir;
wherein the main reservoir comprises an interior;
wherein the auxiliary reservoir is located within the interior of the main reservoir; and
wherein the auxiliary reservoir comprises an upper portion, a lower portion and a lubricant pickup region, the upper portion having an opening via which lubricant in the auxiliary reservoir flows into the main reservoir, the upper portion further having an inward-projecting lip circumscribing the opening, and the lower portion of the auxiliary reservoir is substantially hemispherical to cause lubricant to drain towards the lubricant pickup region.

2. The lubrication system of claim 1, wherein the main reservoir comprises a second lubricant pickup region in a lower portion of the main reservoir, wherein the lower portion of the main reservoir is shaped to cause lubricant to drain towards the second lubricant pickup region.

3. The lubrication system of claim 1, wherein an isolation valve is provided on each of the first and second lubricant scavenge paths.

4. The lubrication system of claim 1, wherein the engine component is a gearbox comprising one or more journal bearings, and the main and auxiliary lubrication systems are configured to supply lubricant to the journal bearings.

5. A gas turbine engine for an aircraft, the gas turbine engine comprising:
an engine core comprising a turbine, a compressor, and a core shaft connecting the turbine to the compressor;
a fan located upstream of the engine core, the fan comprising a plurality of fan blades;
a gearbox that receives an input from the core shaft and outputs drive to the fan so as to drive the fan at a lower rotational speed than the core shaft; and
the lubrication system according to claim 1.

6. The gas turbine engine according to claim 5, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

7. A method of filling a lubrication system according to claim 1, the method comprising the steps of:
filling the auxiliary reservoir of the lubrication system according to claim 1 with a lubricant; and
overflowing lubricant from the auxiliary reservoir into the main reservoir to at least partially fill the main reservoir.

* * * * *